United States Patent Office 3,287,087
Patented Nov. 22, 1966

3,287,087
FLUID BED PROCESS FOR PRODUCING RUTILE PIGMENT AND REDUCING PIGMENT ACCRETION
Arthur Wallace Evans, Alan Edward Callow, and John Peacock, Middlesbrough, England, assignors to British Titan Products Company Limited, Durham, England, a company of the United Kingdom
No Drawing. Filed Feb. 4, 1963, Ser. No. 256,152
Claims priority, application Great Britain, Feb. 5, 1962, 4,416/62
7 Claims. (Cl. 23—202)

The present invention relates to a process for the production of titanium dioxide by the vapour phase oxidation of a titanium tetrahalide in the presence of hot inert solid particles. Methods for such production are described, for example, in British patent specifications Nos. 761,770 and 860,301.

It has been found in such vapour phase oxidation that a large proportion of the titanium dioxide formed tends to remain on the inert solid particles in the form of an accretion. This accretion is normally very hard and it is normally impossible to recover from it useful amounts of satisfactory pigmentary titanium dioxide. The titanium dioxide which can be ground from this very hard accretion is only a fraction of the total accretion and in any case it can only be used for purposes not requiring titanium dioxide of good pigmentary characteristics, for example in vitreous enamels. The high proportion of the total titanium dioxide formed in the vapour phase oxidation which is lost from use as pigment because it forms into this hard accretion on the bed particles is a very severe disadvantage of the normal vapour phase process using inert solid particles, since it makes the process very inefficient in that the yield of titanium dioxide of good pigmentary properties is much smaller than is desirable.

It is an object of the present invention to provide means for diminishing the accretion so as to increase the amount of titanium dioxide with good pigmentary characteristics which is formed and in this way to provide a useful increase in the efficiency of the process.

It is desirable that titanium dioxide pigment should have a uniform particle size. For many purposes it is also desirable that the pigment should have a mean particle size towards the lower end of the pigmentary range of about 0.2 to 0.3 micron; such purposes include the provision of pigment having high tinting strength and brightness at low pigment volume concentration.

It is an object of the present invention to provide means for preparing pigment having these properties.

The pigmentary titanium dioxide formed in the vapour phase oxidation may be mainly anatase or rutile. When titanium tetrahalide is oxidised with an oxygenating gas in the absence of an appropriate modifying agent, the product is mainly anatase. However, rutile is generally preferred to anatase for pigmentary use, since rutile shows greater resistance to deterioration when incorporated into paints, etc., which are exposed to varying climatic conditions. It is therefore very desirable to produce pigmentary titanium dioxide which has a high content of the rutile form.

It is an object of the present invention to provide means for producing titanium dioxide containing more than 95% of crystalline rutile by the vapour phase oxidation of titanium tetrahalides in the presence of hot inert solid particles.

Accordingly, the present invention is a process for the production of titanium dioxide containing more than 95% of crystalline rutile comprising reacting an oxygenating gas and a titanium tetrahalide in the presence of hot inert solid particles and in the presence of zirconium tetrahalide as modifying agent, and thereafter recovering finely divided titanium dioxide.

It is envisaged that the hot solid particles will be such as to be retained in the reaction zone and not entrained with the effluent gases. The particles will normally therefore have a minimum diameter of $74\mu$. The upper limit in practice may be $1800\mu$. The preferred size range in practice may be $100\text{–}400\mu$.

It is preferred that the reaction takes place in a heated fluidised bed of the hot inert solid particles, such as described in British specification No. 761,770. When such a fluidised bed is used, it is normally maintained at a temperature in the range 900° to 1200° C., preferably in the range 950° C. to 1100° C. At temperatures within these ranges, and in particular within the latter range, titanium dioxide recovered from above the bed has a high tinting strength.

The temperature of the fluidised bed is preferably maintained autothermally in the desired range by the heat of the reaction between the oxygenating gas and the titanium tetrahalide, particularly if the fluidised bed is sufficiently large and/or sufficiently well insulated to allow only small heat losses. For example, a fluidised bed having a diameter greater than 15″, preferably greater than 18″, will normally allow operation of the process without the necessity for the introduction of heat other than that produced by the reaction.

Fluidisation of the bed may be initiated and maintained by the introduction of one or more of the reactants in gaseous form into the lower part of the bed, e.g. through the base of the bed, at a sufficiently high rate of flow. If desired, fluidisation may be assisted by the introduction of an inert gas. In the latter case, however, the recovery of the halogen produced during reaction is rendered more difficult because of the diluent effect of the inert gas.

Alternatively, the process of the present invention can be performed in the general manner described in British specification No. 860,301 wherein the hot inert solid particles are used as heat exchange material circulating between two stages, e.g. in the form of a fountain of the particles, so that autothermal operation can be achieved.

Where the oxidation is not carried out under autothermal conditions it will be necessary to maintain the reaction temperature by the introduction of heat from an outside source. This may be supplied, for example, by the burning of a fuel (such as oil, carbon or carbon monoxide) or by electrical heating.

The oxygenating gas introduced into the bed may be any gas which is capable of oxidising the titanium tetrahalide to titanium dioxide. It is preferred, however, to use either oxygen, either alone or in admixture with an inert gas, e.g. in air, for this purpose.

The titanium and zirconium tetrahalides are preferably titanium tetrachloride and zirconium tetrachloride respectively. The tetrahalides include titanium tetraiodide and tetrabromide, and zirconium tetraiodide and tetrabromide. It is preferred that the halogen constituent of the zirconium tetrahalide be similar to the halogen constituent of the titanium tetrahalide.

Only a small proportion of the zirconium tetrahalide is necessary for introduction into the heated reaction zone, in order to achieve the objects of the invention. An amount in the range of 0.5% to 7% (estimated as zirconium dioxide), by weight of the titanium tetrahalide (estimated as titanium dioxide) introduced into the zone, is preferred for this purpose and particularly an amount in the range of 1% to 4% by weight.

If it is desired to produce a final product containing mixed titanium dioxide and zirconium dioxide, one may use an additional amount of the zirconium tetrahalide, e.g. an amount such that the total amount of zirconium dioxide in the final product is up to 25%, by weight of the final product.

One may introduce only the oxygenating gas, the titanium tetrahalide and the zirconium tetrahalide into the reaction zone. However, other additions may be made to the bed, for examples of materials used in the art of oxidising titanium tetrahalide. Such materials include aluminium trihalides, silicon tetrahalides, and water. Suitable amounts of these are: aluminium trihalide, 0.1–10%; silicon tetrahalide, 0.01–1%; water, 0.01–1% (these proportions being by weight of total oxides produced).

There may also be added to the bed a source of the element potassium, rubidium or caesium.

The titanium tetrahalide and zirconium tetrahalide are preferably heated before introduction into the reaction zone, particularly when this contains a fluidised bed, to ensure that they enter the zone as vapours. These vapours may be mixed before introduction or they may be introduced separately. The latter method is preferred, particularly when the zirconium tetrahalide is introduced with the oxygenating gas. If the zirconium tetrahalide is introduced with the oxygenating gas, the oxygen and zirconium tetrahalide are preferably pre-heated to a temperature below that at which the reaction between these substances will take place; for example, the pre-heating may be to a temperature up to 300° C.

When the reaction takes place in a heated fluidised bed, most of the titanium dioxide produced (from about 60 to about 80% or possibly more) will be entrained, in the effluent gases and carried away from the reaction chamber. This entrained titanium dioxide will be mainly rutile. The remainder of the titanium dioxide produced generally forms an accretion which may be quite hard on the particulate material constituting the fluidised bed.

The fluidised bed will therefore increase in volume and the excess may be removed at intervals, or removed continuously such as by a bed overflow. The excess material so removed from the bed may be subjected to grinding to remove some of the accretion on the particulate material. Although the invention provides a very useful decrease in the amount of the accretion, it is normally not possible to eliminate it entirely. The material ground from the accretion may be used in vitreous enamels or for other purposes not requiring very good pigmentary characteristics.

After grinding, the particulate material will be much coarser than the ground off titanium dioxide particles, and so either gas or liquid separation will permit easy classification and will allow the particulate material to be recovered and returned to the reaction zone, if desired. The titanium dioxide removed in the process of grinding may be collected and recovered.

Among the methods of grinding which may be used for the purpose described in the last paragraph are many forms of milling conducted by wet or dry processes. It is preferred to use a wet process.

It may be advantageous when milling the material from the bed to use mills having an agitator wherein the agitator is made, at least on the surface, of polyurethane rubber and revolves in a vessel which may itself be lined with polyurethane rubber.

The following examples illustrate the present invention.

*Example 1*

A 3" diameter silica tube was set up vertically in an electric furnace. The tube was sealed at the bottom with a plate through which were inserted two silica tubes, one having an opening 1", and the other 2", above the plate. The former tube was connected to a source of oxygen and provision was made for the introduction into the oxygen stream of zirconium tetrachloride vapour. The latter tube was connected to a source of titanium tetrachloride vapour.

A bed of titanium dioxide particles of −44 +72 size B.S.S. 6" deep was formed in the tube above the plate and the electric furnace was switched on. The temperature of the bed was adjusted to, and maintained at, 1050° C.

55 cc./minute of liquid titanium tetrachloride was vapourised and introduced. Oxygen was introduced at a flow rate of 18 litres/minute. Sufficient zirconium tetrachloride was introduced into the oxygen stream to provide 2% by weight of zirconium dioxide on the titanium tetrachloride introduced into the bed (estimated as titanium dioxide).

The process was continued for 30 minnutes and was then stopped. The bed was removed when it had cooled.

The titanium dioxide entrained in the gas leaving the bed was collected and examined for tinting strength and weighed.

It was found that about 64%, by weight, of the titanium dioxide produced was entrained in the gas leaving the bed as pigmentary titanium dioxide. 97% of this pigmentary titanium dioxide was rutile. The tinting strength of this material was 1620 on the Reynolds scale. The mean crystal size of this pigment was 0.21 micron.

The remainder of the titanium dioxide produced was retained on the bed particles as an accretion. These particles were subjected to abrasion by mixing with sand and water in a vessel containing an impellor consisting of several discs on a rotating shaft. A small proportion of the accretion removed from the bed particles was recovered as pigmentary titanium dioxide. This material had a satisfactory tinting strength and a rutile content of 97%, by weight. The remainder of the accretion removed from the bed particles was in the non-pigmentary form which was suitable for use in the formation of vitreous enamels and in the production of ceramics.

As a contrast to Example 1, a process was carried out which was similar to Example 1 except that no zirconium tetrahalide was used. Only 56% of the titanium dioxide produced was entrained in the gas leaving the bed. Only 40% of this entrained titanium dioxide was rutile. The tinting strength of this material was only 1410 on the Reynolds scale. The mean crystal size of this material was 0.28 micron. These figures may be compared with those given in Example 1.

*Example 2*

The process of Example 1 was repeated, but in addition to the zirconium tetrachloride sufficient aluminum trichloride was added to the oxygen stream to provide 3% of alumina, by weight of the titanium tetrachloride (estimated as titanium dioxide).

The titanium dioxide entrained in the gas leaving the bed was collected and examined for tinting strength and weighed.

It was found that 65%, by weight, of the titanium dioxide produced was entrained in the gas leaving the bed as pigmentary titanium dioxide. 99% of this pigmentary titanium dioxide was rutile. The tinting strength of this pigment was 1,610 on the Reynolds scale.

The proportion of pigmentary titanium dioxide recovered from the accretion was similar to that in Example 1, and it had a satisfactory tinting strength and a rutile content of about 99%.

*Example 3*

The process of Example 2 was repeated, except that in addition to the zirconium tetrachloride and aluminium trichloride introduced with the oxygen, silicon tetrachloride was introduced with the titanium tetrachloride in an amount of 0.25% of silica, by weight of the titanium tetrachloride (estimated as titanium dioxide).

The titanium dioxide entrained in the gas leaving the bed was collected and examined for tinting strength and weighed.

It was found that 65%, by weight, of the titanium dioxide produced was entrained in the gas leaving the bed as pigmentary titanium dioxide. 96% of this pigmentary titanium dioxide was rutile. The tinting strength of this material was 1,680 on the Reynolds scale.

The remainder of the titanium dioxide produced was retained on the bed particles as an accretion. Of this 35% of the titanium dioxide produced which was retained as accretion, practically all was recovered as pigmentary titanium dioxide by wet milling. This pigment had a rutile content of 97% by weight and an acceptable tinting strength.

*Example 4*

The process of Example 1 was repeated except that the bed material was initially treated with aqueous potassium chloride to have a 1% potassium chloride content after being dried and before use in the process.

The titanium dioxide entrained in the gas leaving the bed was collected and examined for tinting strength and weighed.

It was found that 72%, by weight, of the titanium dioxide produced was entrained in the gas leaving the bed as pigmentary titanium dioxide. 98% of this pigmentary titanium dioxide was rutile. The tinting strength of this material was 1,520 on the Reynolds scale. This pigment had a mean crystal size of 0.15 micron.

The characteristics of the accretion were similar to those in Example 1.

What is claimed is:

1. In a process for producing titanium oxide pigment by the vapor phase oxidation of a titanium tetrahalide selected from $TiCl_4$, $TiBr_4$, and $TiI_4$ at 900 to 1200° C. within a fluidized bed of hot inert solid particles having a diameter of 74 to 1800 microns, a process for producing a rutile pigment and reducing the accretion of the pigment on the hot bed particles thereby increasing the amount of pigment entrained in the effluent gases withdrawn from the bed which comprises introducing to the bed 0.5 to 7.0 percent by weight zirconium tetrahalide selected from $ZrCl_4$, $ZrBr_4$, and $ZrI_4$ based on the weight of the titanium tetrahalide introduced to the bed, and oxidizing the titanium tetrahalide in the presence of said zirconium tetrahalide.

2. The process of claim 1 wherein the titanium tetrahalide is $TiCl_4$.

3. The process of claim 1 wherein the zirconium tetrahalide is $ZrCl_4$.

4. The process of claim 1 wherein the zirconium tetrahalide is introduced to the bed in admixture with an oxidizing gas.

5. The process of claim 1 wherein the zirconium tetrahalide is $ZrCl_4$ and the titanium tetrahalide is $TiCl_4$.

6. In a process for producing titanium oxide pigment by the vapor phase oxidation of a titanium tetrahalide selected from $TiCl_4$, $TiBr_4$, and $TiI_4$ within a fluidized bed of inert solid particles maintained at a temperature of 900 to 1200° C., a process for producing a rutile pigment and reducing the accretion of the pigment on the bed particles which comprises oxidizing the titanium tetrahalide in the presence of a small amount of a zirconium tetrahalide selected from $ZrCl_4$, $ZrBr_4$, and $ZrI_4$, the halogen in the titanium tetrahalide and in the zirconium tetrahalide being the same.

7. The process of claim 6 wherein there is introduced to the bed 1.0 to 4.0 percent by weight zirconium tetrahalide based on the weight of the titanium tetrahalide introduced to the bed.

References Cited by the Examiner
UNITED STATES PATENTS

| | | | |
|---|---|---|---|
| 2,347,496 | 4/1944 | Muskat et al. | 106—300 |
| 3,043,657 | 7/1962 | Hughes et al. | |
| 3,068,113 | 12/1962 | Strain. | |
| 3,105,742 | 10/1963 | Allen et al. | |
| 3,148,027 | 9/1964 | Richmond. | |

OSCAR R. VERTIZ, *Primary Examiner.*

MAURICE A. BRINDISI, MILTON WEISSMAN,
*Examiners.*

E. STERN, *Assistant Examiner.*